United States Patent [19]

Chiba et al.

[11] 3,865,801

[45] Feb. 11, 1975

[54] STABILIZATION OF URINARY ERYTHROPOIETIN USING SODIUM P-AMINOSALICYLATE AND EXTRACTING INTO PHENOL

[75] Inventors: Shyozo Chiba, Tokyo, Japan; Charles K. H. Kung, Country Club Hills; Eugene Goldwasser, Chicago, both of Ill.

[73] Assignee: The United States of America as represented by the United States Atomic Energy Commission, Washington, D.C.

[22] Filed: June 15, 1973

[21] Appl. No.: 370,520

[52] U.S. Cl. ............................. 260/112 R, 424/99
[51] Int. Cl. ............................................ C07g 15/00
[58] Field of Search ............ 260/112 R; 424/101, 99

[56] References Cited
UNITED STATES PATENTS
3,033,753   5/1962   White et al. ...................... 424/101

OTHER PUBLICATIONS

Nature, 1961, p. 75, Lowy et al.
Chem. Abstracts, Vol. 74, 1971, 49756t, Zivny et al.
Clinica Chimica Acta, 13(1966), pp. 491–497, Lowy et al.
J. Lab & Clinical Medicine, 1969, pp. 154–162, Lewis et al.
Chem. Abstracts, Vol. 61, 1964, 10920c, Winkert et al.

Primary Examiner—Howard E. Schain
Attorney, Agent, or Firm—John A. Horan; Arthur A. Churm; Robert J. Fisher

[57] ABSTRACT

A method is provided for stabilizing the biological activity of urinary erythropoietin. The erythropoietin is extracted from a phosphate-buffered-saline solution of the crude urinary erythropoietin into a quantity of equilibrated phenol. After separation of the phases, the phenol fraction is dialyzed against a phosphate-buffered-saline solution and the erythropoietin is recovered from the dialyzed fraction. Following extraction and recovery, the biological activity of the erythropoietin is stabilized. Extraction of the erythropoietin into the phenol fraction is enhanced by the presence of sodium paraaminosalicylate.

5 Claims, 1 Drawing Figure

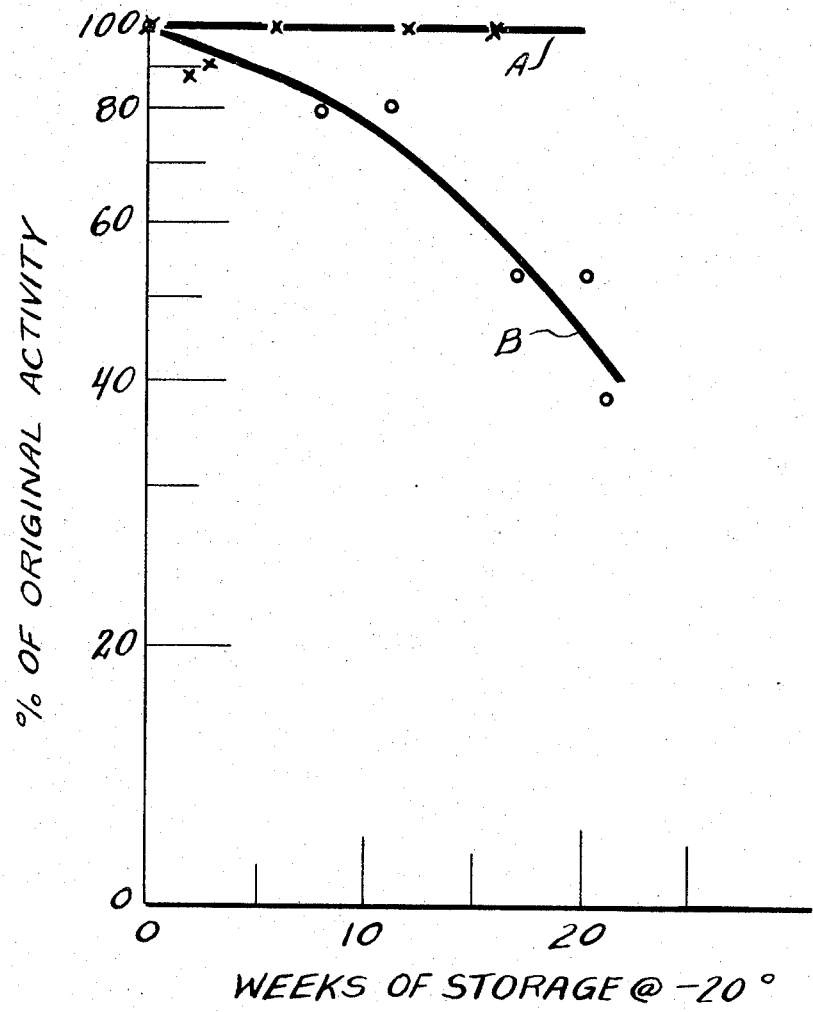

3,865,801

STABILIZATION OF URINARY ERYTHROPOIETIN USING SODIUM P-AMINOSALICYLATE AND EXTRACTING INTO PHENOL

CONTRACTUAL ORIGIN OF THE INVENTION

The invention described here was made in the course of, or under, a contract with the UNITED STATES ATOMIC ENERGY COMMISION.

BACKGROUND OF THE INVENTION

This invention relates generally to the stabilization of erythropoietin and is particularly concerned with the stabilization of the biological activity of urinary erythropoietin. Still more particularly, this invention involves a method for the separation of erythropoietin from other components which have an adverse effect on the biological activity of erythropoietin, and it is specifically directed towards the separation of protease activity and sialidase activity from the erythropoietin in order to stabilize its biological activity.

Erythropoietin is a hormone which is involved in the formation of red blood cells. As such, erythropoietin has been a focal point of much study and active research. While erythropoietin can be recovered from the blood plasma, urine from anemic patients has been an important source of large amounts of crude erythropoietin. While the separation of erythropoietin from blood plasma has provided satisfactorily potent and stable water-soluble preparations, one of the impediments in purifying urinary erythropoietin, despite the initial advantage of having starting material with low protein concentration, is its marked instability.

Previous separation procedures reported in the prior art have shown a loss of activity of up to 75% of that contained in the original preparation. Lowy and Keighley reported in the Oct. 7, 1961 issue of Nature, page 75, that by using as little as 0.1% phenol in all equilibration and elution buffers and on both sides of the membrane during dialysis, about 50% of the erythropoietic activity contained in the original urine could be recovered. As suggested explanations of the improved recovery, they hypothesized that the presence of phenol during isolation may prevent subtle changes through bacteriostasis, enzyme inactivation, anti-oxidant action, etc. It has been shown elsewhere in the prior art that there are large losses during fractionation, and in our early experience with urinary erythropoietin concentrates, losses were considerably greater than those we found for comparable steps when working with plasma. Loss of activity was even found during storage at $-20°$ C.

It is an object of the present invention to provide a method for the stabilization of urinary erythropoietin.

It is another object of the present invention to provide a method for the separation of erythropoietin activity from crude urinary erythropoietin which will give a stabilized erythropoietin activity.

It is a further object of the present invention to provide a method for the separation of urinary erythropoietin which will permit recovery of a very large percentage of the original activity present.

Another object of the present invention is to provide a method for the stabilization of urinary erythropoietin which will permit storage of the erythropoietin for long periods of time without significant loss of the biological activity.

Other objects and advantages of the present invention will become apparent upon reading the following description and with particular reference to the specific embodiment described hereinbelow.

SUMMARY OF THE INVENTION

In accordance with the present invention, the biological activity of erythropoietin is stabilized by separating out the erythropoietin from a preparation of crude urinary erythropoietin. A preparation of crude urinary erythropoietin in a phosphate-buffered-saline solution is combined with a quantity of equilibrated phenol, and the erythropoietin is extracted into the phenol phase. The separated phenol fraction is dialyzed against phosphate-buffered-saline solution and the erythropoietin recovered from the dialyzed fraction. The recovered erythropoietin is biologically stabilized and can be stored for prolonged periods without loss of biological activity. Sodium para-aminosalicylate is added prior to the extraction step in order to enhance the extraction of the erythropoietin into the phenol.

BRIEF DESCRIPTION OF THE DRAWING

An understanding of the features and operation of the present invention can be obtained from a reading of the following description and with reference to the drawing which is a graph showing the stablity of the biological activity of erythropoietin preparations over a period of time.

DETAILED DESCRIPTION OF THE INVENTION

While the invention is hereinafter described in connection with a particular specific example, it will be understood that it is not intended to limit the invention to only that specific embodiment, but it is intended to cover all alternative modifications and equivalents that may be included within the spirit and scope of the invention as defined by the appended claims.

During attempts to separate and purify the erythropoietin, considerably greater losses in the biological activity were experienced when dealing with urinary errythropoietin concentrates than were experienced for the comparable processes when dealing with plasma erythropoietin. It has been determined that urine concentrates contain both protease and sialidase activities that are probably the cause of the instability. Therefore, the following method for separating the erythropoietic activity from the protease and sialidase activities in order to stabilize the erythropoietin was devised.

Starting materials were two different crude precipitates from erythropoietin-rich human urine. They were supplied by the National Blood Resources Branch of the National Heart and Lung Institute, Bethesda, Maryland, and were derived from the collection center in Corrientes, Argentina, with some processing at the Children's Hospital, Los Angeles, California. One preparation was labeled C-1 and the other TaLSL.

Assay for erythropoietin was done by the fasted rat method, using as a standard a plasma fraction that had been standardized against the Internal Reference preparation. The fasted rat method is described in an article by E. Goldwasser, and C. K.-H. Kung, in the Proceedings of National Academy of Sciences of the United States, Vol. 68, p. 697 (1971). All assays were done with groups of five rats and by interpolation of the log dose-log response curve using standard doses of 1, 2, and 3 units per rat. Protein concentrations were determined by measurement of absorbance at 278 nm, and using the value of $A_{278}^{1\%} = 10$ derived from measurements of mixtures of glycoproteins.

Assay for protease activity was done using as substrate an insoluble collagen-dye complex (Azocoll, Calbiochem). A suspension of 1 mg of the substrate in 200 µl of 0.1 M phosphate buffer at pH 7.0, mixed with 1 mg of crude urinary erythropoietin preparation in 200 µl of the same buffer, was incubated for 15 minutes at 37° C., the insoluble material removed and the solution absorbance at 530 nm was read. A blank consisting of the same concentration of substrate but with no source of protease was incubated simultaneously and the activity determined from the difference between the blank and the experimental readings.

Sialidase activity was determined using sialyllactose (5 mg/ml in 0.1 M Na acetate, 0.01 M $CaCl_2$, pH 4.5) as substrate. After incubation with the erythropoietin preparations for 3 hours, the free sialic acid was determined by the alkaline-Ehrlich's method, described in an article by D. Aminoff, Biochemical Journal, Vol. 81, page 384 (1961).

The C-1 material at 10 mg/ml was dissolved in 8 M urea in phosphate-buffered saline solution in order to enhance the dissolution of the erythropoietin. As used herein, the term phosphate-buffered-saline solution refers to a standard solution of phosphate buffer and in the case of the present example refers to a solution which has a composition of 0.145 molar sodium chloride and 0.013 molar sodium phosphate buffer at pH 7.3. The urea was then removed by pressure ultrafiltration through a U-10 membrane obtained from Amicon Corporation, Lexington, Massachusetts, the separation being conducted in the cold. This particular preparation is so insoluble that a high concentration of the urea was necessary to solubilize it; the activity then stays in solution in the phosphate-buffered-saline solution when the urea is removed. After complete removal of the urea, the crude erythropoietin in phosphate-buffered-saline solution was heated for 5 minutes at 100° C. to aid the dissolution. The solution was then chilled and centrifuged, in order to remove the impurities which precipitate, the precipitate being washed once with cold phosphate-buffered-saline solution. The pooled supernatants were frozen until the next step.

Because it is more readily dissolved, the TaLSL preparation was put directly into cold phosphate-buffered-saline solution at 10 mg/ml, then heated at 100° C. for 1 minute and centrifuged as described in the C-1 preparation mentioned above.

A quantity of phenol to be used to treat the erythropoietin preparation was then equilibrated with buffer and para-aminosalicylate in order to saturate the phenol with the aqueous components. In the present case, a mixture of 1 volume of phosphate-buffered-saline solution, 1 volume of phosphate buffer, in the present case, being 0.2 M phosphate buffer at pH 7.0, 3 volumes of sodium para-aminosalicylate, in the present instance, being 0.475 M, and 5 volumes of freshly distilled phenol were shaken vigorously in the cold, and the phases allowed to separate. Following phase separation the upper aqueous phase was discarded. While in the present case the phosphate buffer was 0.2 M, it is felt that the concentration of the phosphate does not play an important role in the process. Similarly, although the particular concentration of 0.475 M sodium para-aminosalicylate was used in the present case, it is felt that minor deviations from this particular concentration will not adversely affect the process and are entirely permissible. However, the pH of the solution does play an important role inasmuch as a significant deviation from a neutral solution will introduce a chemical instability in the compounds under consideration. Therefore, significant deviation from a neutral solution of pH 7.0 should be avoided, and it is preferable that the pH be maintained in the range of 6.5 to 7.5. It is believed that there will be no adverse effects if the pH is maintained in this particular range, and a pH of 7.0 is preferred.

To each preparation of the crude urinary erythropoietin in phosphate-buffered-saline solution, enough phosphate buffer at pH 7.0 and sodium para-aminosalicylate were added to make final concentrations 0.04 M and 0.285 M respectively. These particular final concentrations are purely arbitrary and are determined solely from the dilution factors introduced in the equilibration of the phenol by the above-described steps using the particular above-mentioned concentrations. The phosphate buffer and sodium para-aminosalicylate are added to achieve these final concentrations in order that the concentrations of the components are the same in all solutions. Each of the preparations of erythropoietin was then vigorously shaken with an equal amount of the phenol equilibrated as hereinabove described, and the phases were separated by centrifugation in the cold. The separated fractions, including any interphase material, were dialyzed against a phosphate-buffered-saline solution in the cold to remove the phenol, and were subsequently concentrated by pressure ultrafiltration. The phenol is driven from the solution across the membrane whereas the erythropoietin remains on the initial side of the membrane and is supported in a solution of the phosphate-buffered-saline which moves freely across the membrane. The fraction which was derived from the phenol phase still contained an appreciable amount of phenol. In order to separate the erythropoietin from the remaining phenol, the proteins were removed by precipitation with cold alcohol which was added to a final concentration of 90%. The resulting precipitate of the proteins, including the erythropoietin, was then dissolved in phosphate-buffered-saline solution prior to assay.

Assays for protease and silaidase activities in the treated and untreated erythropoietin preparations are shown in the following Table I.

TABLE I

Protease and Silidase Activities in Erythropoietin Preparations

| Sample | Protease Activity $\Delta A530$ | Sialidase Activity Sialic acid freed (µg in 180 min) |
|---|---|---|
| Original C-1 | 0.057 | 0.18 |
| Phenol-treated C-1 | 0.013 | 0.0 |
| Alcohol-precipitated, phenol-treated C-1 | 0.015 | 0.0 |

As can be seen from a study of the results listed in the table, after phenol extraction about 75% of the protease activity was lost. Alcohol precipitation did not cause any further loss or separation of the protease activity from the erythropoietin activity. The loss or inactivation of the sialidase activity in a treated preparation was complete as can be seen from the third column. It is believed that the phenol acts to denature the protease and sialidase enzymes through an interaction which causes changes in the molecular structure which inactivates the enzymes. It is also a possibility, although this could not be ascertained, that some separation results from the extraction of the erythropoietin into the phenol.

Results of bioassay of fractions from erythropoietin preparations are presented in the following Table II.

TABLE II

Erythropoietin Activity of Phenol-Treated Fractions in the Presence of Sodium p-Aminosalicylate

| Sample | Total Units | Potency Units per mg of Protein | Recovery % |
|---|---|---|---|
| Heated C-1 | 3,820 | 7.5 | (100) |
| Upper and interphases | 0 | | 0 |
| Lower phase | 3,660 | | 95.8 |
| Alcohol precipitate | 3,540 | 10.5 | 92.7 |
| Heated TaLSL | 7,220 | 32 | (100) |
| Upper and interphases | 0 | | 0 |
| Lower phase | 7,070 | | 97.9 |
| Alcohol precipitate | 6,500 | 47 | 90.0 |

The results listed in the above table are the average results of six experiments using the C-1 preparation and three experiments using the TaLSL preparation. The data in the above table show that the potency of the erythropoietin activity defined as units of erythropoietin activity per milligram of protein actually increased after the separation by extraction into phenol. It should also be noted that the recovery of the erythropoietin activity was more than 90% in all instances.

Extractions were also conducted into the phenol without the presence of sodium para-aminosalicylate. The following Table III shows the results of a typical experiment in which erythropoietin was extracted into phenol without the presence of sodium para-aminosalicylate.

TABLE III

Erythropoietin Activity of Phenol-Treated Fractions in the Absence of Sodium p-Aminosalicylate

| Sample | Recovery % |
|---|---|
| Heated C-1 | (100) |
| Upper Aqueous Phase | 12.3 |
| Interphase | 11.5 |
| Lower Phenol Phase | 33.5 |
| Remainder of activity not recovered | 42.7 |

As can be seen from a comparison of the results in Tables II and III, the presence of sodium para-aminosalicylate is extremely important in extracting erythropoietin into the phenol. In the absence of sodium para-aminosalicylate, the erythropoietic activity is variably recovered in all three fractions, and the percent of activity recovered is not as great. When the phenol extraction is done in the presence of sodium para-aminosalicylate, more than 90% of the activity is recovered and this activity is exclusively recovered from the phenol phase. Therefore, it is seen that the sodium para-aminosalicylate serves to drive the erythropoietin into the phenol during the extraction step.

Following the extraction of the erythropoietin into the phenol phase by the method as above described, a separation from the protease and silidase activities was found to have occurred and the biological activity of the erythropoietin was found to be highly stabilized. The increased stability of the urinary erythropoietin by the above method is most clearly seen from the drawing which is a graphic representation of the biological activity of the erythropoietin over a period of time. Referring to the drawing, there is shown a graph in which the percent of the original biological activity of the erythropoietin is plotted on the vertical axis versus the weeks of storage at −20° C. plotted on the horizontal axis. Curve A, plotted along the points indicated by x's, is a representation of the percent of original activity versus time for urinary erythropoietin which was stabilized in accordance with the method of the present invention. As can be seen from curve A for at least the first 16 weeks of storage in the frozen state, the phenol-treated erythropoietin concentrate lost very little activity. Curve B which is plotted along points indicated by small circles is a representation of the percent of original activity versus time for crude urinary erythropoietin from the starting material which was not treated in accordance with the above-described method of the present invention. As is readily apparent from curve B on the graph, the loss of activity from starting material which was not treated in accordance with the method of the present invention was considerable, indicating instability in the untreated material. It is therefore readily seen that the biological activity of urinary erythropoietin can be highly stabilized by the present method.

The embodiments of the invention in which an exclusive property or privilege is claimed are defined as follows:

1. A method of separating erythropoietin activity from portease activity and sialidase activity comprising:
   a. preparing a feed solution of crude urinary erythropoietin in phosphate-buffered-saline;
   b. adding sodium p-aminosalicylate to the feed solution;
   c. extracting the erythropoietion into phenol;
   d. dialyzing the separated phenol fraction against a phosphate-buffered-saline solution; and
   e. recovering erythropoietin from the dialyzed fraction, whereby the erythropoietic activity is separated from the protease activity and the sialidase activity and the biological activity of erythropoietin is stabilized.

2. A method of stabilizing urinary erythropoietin comprising:
   a. preparing a feed solution by dissolving crude urinary erythropoietin in a phosphate-buffered-saline solution;
   b. adding sodium p-aminosalicylate to said feed solution;
   c. equilibrating a quantity of phenol with a phosphate buffer and with sodium p-aminosalicylate;
   d. combining one volume of said feed solution with an equal volume of said equilibrated phenol;
   e. extracting said erythropoietin into the phenol fraction;
   f. dialyzing each of the separated fractions against a phosphate-buffered-saline solution; and
   g. recovering said erythropoietin from said dialyzed fractions, whereby said erythropoietin is stabilized.

3. The method according to claim 1 wherein said erythropoietin is recovered from said dialyzed fractions by precipitation with alcochol.

4. A method of storing urinary erythropoietin for prolonged periods of time without significant loss of biological activity comprising:
   a. stabilizing said urinary erythropoietin in accordance with the method of claim 2;
   b. recovering said erythropoietin from the dialyzed fraction by precipitation with alcohol; and
   c. storing said erythropoietin in the frozen state at −20° C.

5. A method of stabilizing urinary erythropoietin comprising:
   a. preparing a feed solution by dissolving crude urinary erythropoietin in a phosphate-buffered-saline solution;
   b. preparing a quantity of equilibrated phenol by thoroughly mixing together one volume of a phosphate-buffered-saline solution, one volume of about 0.2 molar phosphate buffer at about pH 7.0, three volumes of approximately 0.475 molar sodium p-aminosalicylate and five volumes of freshly distilled phenol, and separating the equilibrated phenol from the upper aqueous phase;
   c. adding to each solution of erythropoietin in phosphate-buffered-saline solution enough phosphate buffer at about pH 7.0 and sodium p-aminosalicylate to make final concentrations of about 0.4 molar and 0.285 molar, respectively;
   d. combining and thoroughly mixing one volume of said feed solution of erythropoietin and an equal volume of said equilibrated phenol;
   e. extracting said erythropoietin into the phenol fraction;
   f. separating the phases by centrifugation in the cold;
   g. dialyzing each of the separated fractions against a phosphate-buffered-saline solution in the cold; and
   h. recovering stabilized erythropoietin from dialyzed fractions by precipitation with cold alcohol at a final concentration of 90%.

* * * * *